United States Patent [19]

Odelius

[11] Patent Number: 5,385,169
[45] Date of Patent: Jan. 31, 1995

[54] SUBSEA FLUID COUPLING EMPLOYING METAL-TO-METAL SEALING

[75] Inventor: Larry D. Odelius, Houston, Tex.

[73] Assignee: Cooper Industries, Inc., Houston, Tex.

[21] Appl. No.: 222,588

[22] Filed: Apr. 4, 1994

[51] Int. Cl.⁶ .............................................. F16L 37/28
[52] U.S. Cl. .................................................. 137/614.03
[58] Field of Search ............. 137/614.03, 614, 614.02, 137/614.04, 614.05

[56] References Cited

U.S. PATENT DOCUMENTS

| | | | |
|---|---|---|---|
| 2,471,237 | 5/1949 | Pasturczak | 137/614.03 |
| 2,819,914 | 1/1958 | Eitner | 137/614.04 X |
| 4,674,535 | 6/1987 | de Menibus | 137/614.03 |
| 4,694,859 | 9/1987 | Smith, III | 137/614.04 |
| 4,754,780 | 7/1988 | Smith, III | 137/614.04 |
| 4,832,080 | 5/1989 | Smith, III | 137/614.04 |
| 4,917,149 | 4/1990 | Grantham | 137/614.03 |
| 4,949,745 | 8/1990 | McKeon | 137/614.03 X |

FOREIGN PATENT DOCUMENTS

| | | | |
|---|---|---|---|
| 1142462 | 9/1957 | France . | |
| 1491524 | 8/1967 | France . | |
| 2409445 | 7/1979 | France | 137/614 |
| 352205 | 3/1961 | Switzerland . | |

*Primary Examiner*—Martin P. Schwadron
*Assistant Examiner*—Kevin L. Lee
*Attorney, Agent, or Firm*—Burns, Doane, Swecker & Mathis

[57] ABSTRACT

A subsea fluid coupling includes male and female parts which can be quickly connected and disconnected. The female part includes a longitudinal aperture in which a slidable gate is disposed, and a first fluid passage communicating with said aperture so as to be blocked by the gate when the coupling is disconnected. The male part includes a conduit body which contains a second passage and which can be inserted longitudinally into the aperture to push the gate out of alignment with the first passage and bring the second passage into alignment with the first passage. Metal seals are carried by the female and male parts and which engage planar metal surfaces to produce metal-to-metal sealing around the first and second passages when the coupling is connected or disconnected. Holes extend laterally through the gate and the conduit body, respectively, for creating a lateral pressure balance on the gate and conduit body.

13 Claims, 2 Drawing Sheets

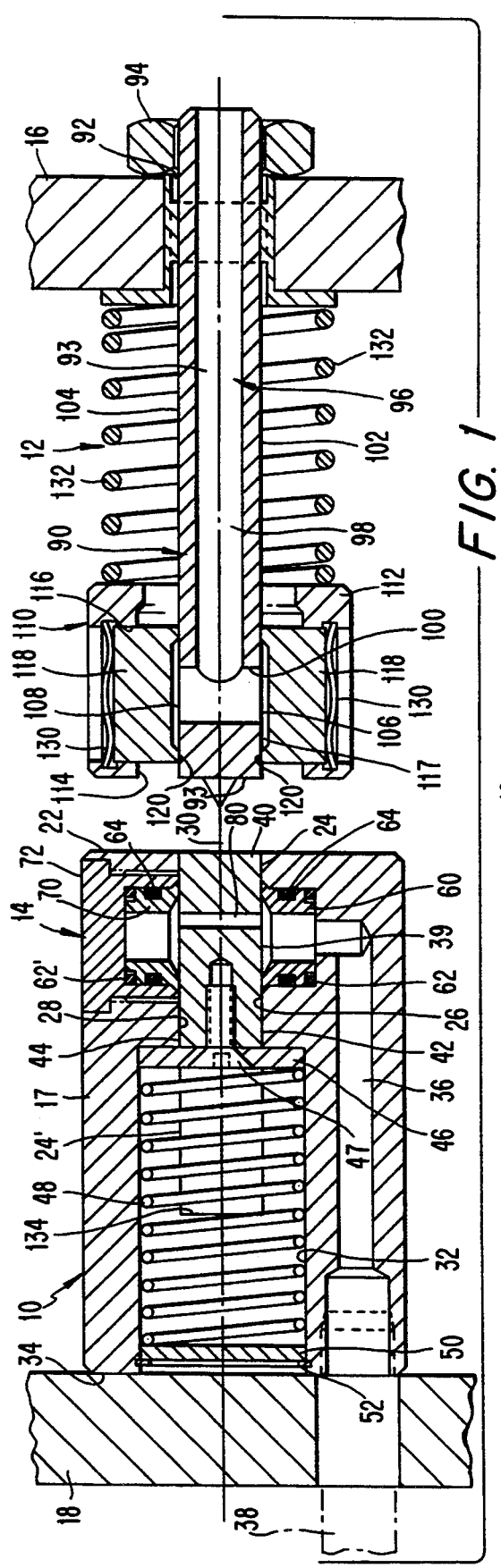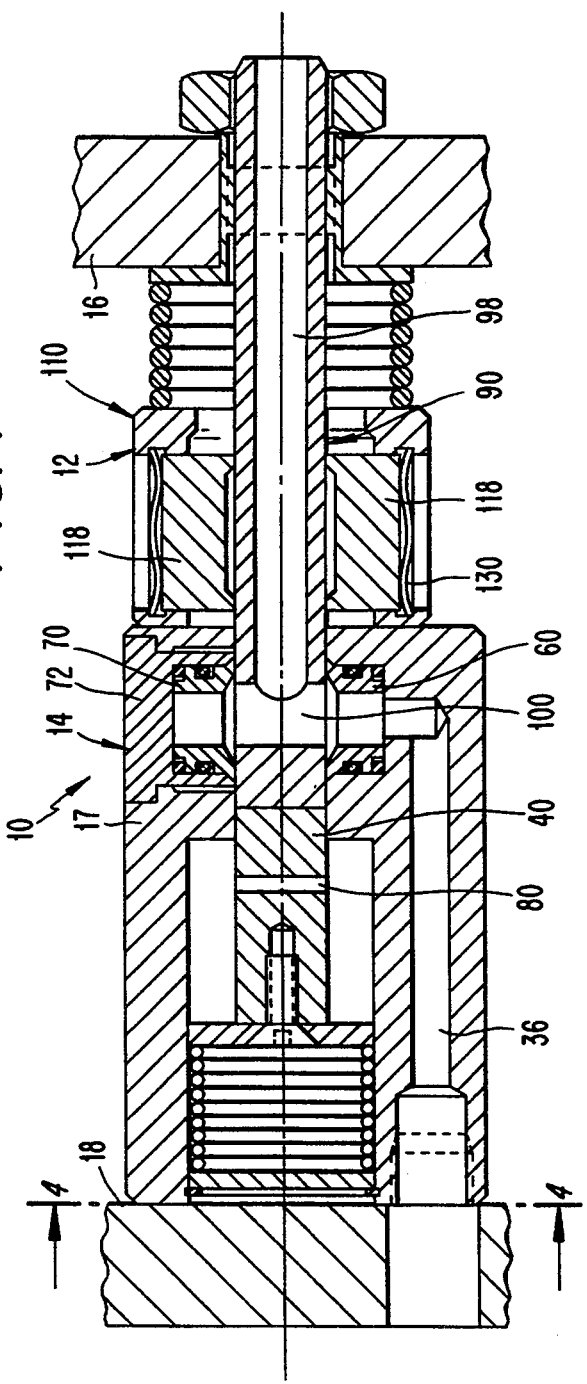

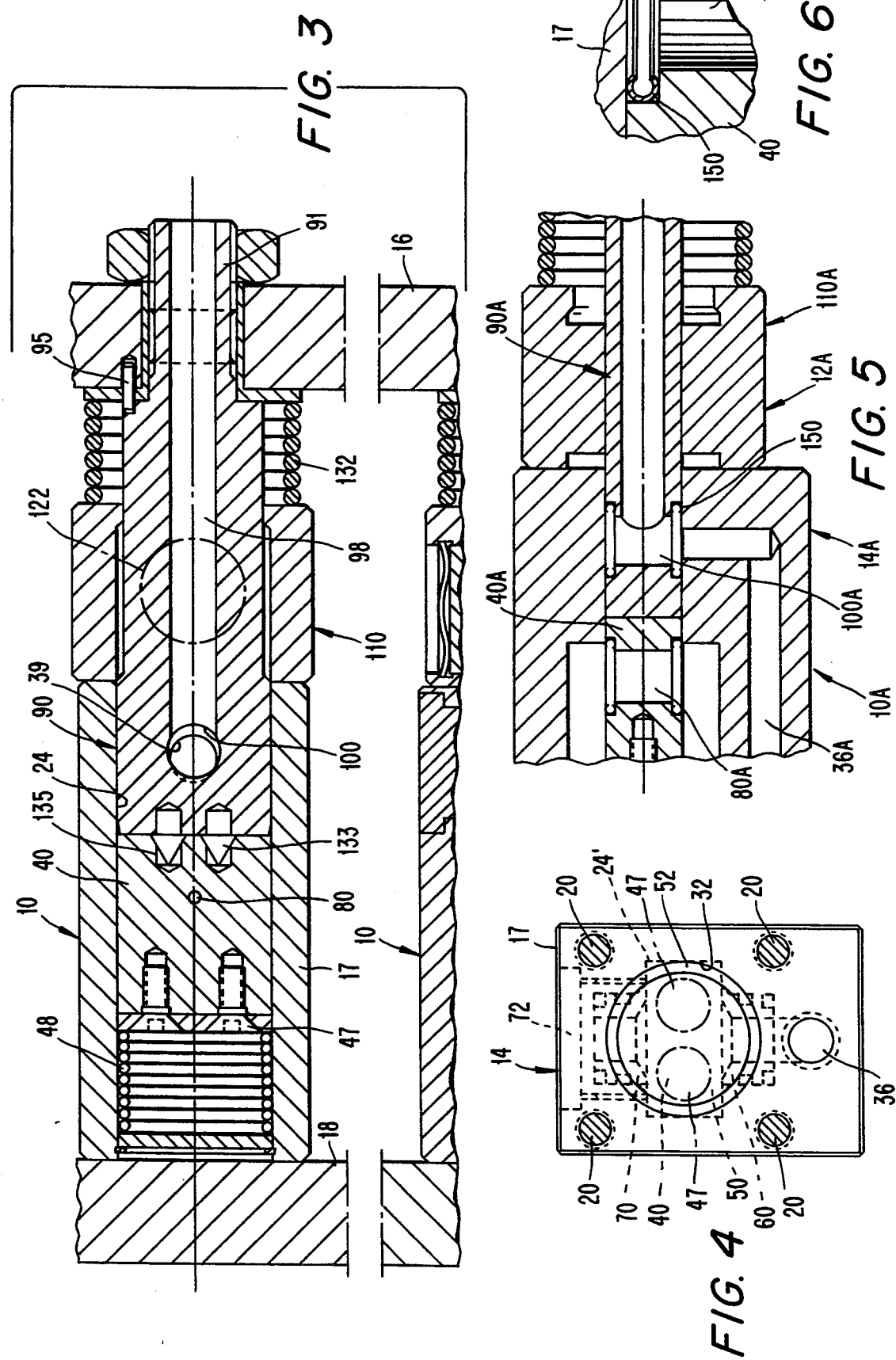

SUBSEA FLUID COUPLING EMPLOYING METAL-TO-METAL SEALING

BACKGROUND OF THE INVENTION

The present invention relates to subsea fluid couplers and, in particular, to a quick-disconnect subsea fluid coupler employing metal-to-metal seals.

Subsea fluid couplers are commonly used in connection with subsea oil wells. Functions of the subsea well are controlled by valves and other devices which are actuated by hydraulic fluid. That fluid is delivered from the water surface through fluid supply conduits which are connected to the subsea well by means of underwater couplings. It is conventional to employ subsea couplings which can be quickly connected and disconnected. Each coupling includes male and female parts connected to respective common mounting plates. By converging the mounting plates, simultaneous connection of the male and female parts can be made. Likewise, simultaneous disconnection of the male and female parts can be made by separating the mounting plates.

It is necessary to provide a sufficient sealing action during connect and disconnect operations to prevent sea water from entering the conduits and to minimize the spilling of hydraulic fluid. It is also desirable to minimize resistance to the connection and disconnection of the male and female parts.

SUMMARY OF THE INVENTION

The present invention relates to a subsea fluid coupling, comprising a male part and a female part. The male part includes a housing defining a first end face, and an aperture which extends longitudinally into the housing through the first end face. The aperture is of non-circular cross-sectional shape and includes first and second walls disposed on opposite lateral sides of a longitudinal axis of the aperture. A first fluid-conducting passage is formed in the housing and intersects the first wall of the aperture to form therewith a first port. A gate is longitudinally slidably disposed in the aperture and includes laterally spaced first and second outer surfaces which are arranged to face the first and second walls, respectively. The gate is biased longitudinally toward the first end face to a port-blocking position. The gate includes a hole extending laterally therethrough for communicating the first port with the second outer surface when the gate is in the port-blocking position.

The male part includes a conduit body of non-circular cross-sectional shape corresponding to the shape of the aperture. The conduit body has third and fourth outer surfaces disposed on opposite lateral sides of a longitudinal axis of the conduit body. The conduit body defines a second end face positionable in facing relationship to the aperture of the housing. The conduit body includes a second fluid conducting passage therein. That second passage includes a first portion extending toward the second end face, and a lateral portion intersecting the third and fourth outer surfaces, respectively, to form therewith second and third aligned ports. The conduit body is sized to enter the aperture through the first end face when the male and female parts are brought together, to push the gate out of its port-blocking position and bring the second and third ports into alignment with the first port. The male part further includes a slide mounted on the conduit body for sliding movement longitudinally therealong and being biased to a port-blocking position. The slide includes laterally spaced third and fourth generally planar walls arranged to be in alignment with the third and fourth ports, respectively, when the slide is in its port-blocking position. A sealing structure is provided which includes first and second annular metal seals disposed in laterally aligned relationship on the female part, and third and fourth annular metal seals disposed in laterally aligned relationship on the male part. The first seal is disposed between the first wall of the aperture and the first outer surface of the gate. The second seal is disposed between the second wall of the aperture and the second outer surface of the gate. The first seal is arranged in surrounding relationship to the first port and to one end of the hole when the gate is in its port-blocking position. The second seal is arranged in surrounding relationship to another end of the hole when the gate is in its port-blocking position. The third seal is disposed between the third wall of the slide and the third outer surface of the conduit body. The fourth seal is disposed between the fourth wall of the slide and the fourth outer surface of the conduit body. The third and fourth seals are in surrounding relationship to the third and fourth ports, respectively, when the slide is in its port-blocking position.

The hole conducts fluid pressure to the opposite lateral surfaces of the gate for laterally pressure balancing the gate when the hole is aligned with the first port. The lateral portion of the second passage conducts fluid pressure to the outer surfaces of the gate for laterally pressure balancing the gate when the gate is disposed in the aperture.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 1 is a longitudinal sectional view through a subsea fluid coupling according to the present invention, with the coupling in a disconnected condition;

FIG. 2 is a view similar to FIG. 1 with the coupling in a connected condition;

FIG. 3 is a longitudinal sectional view taken through FIG. 2;

FIG. 4 is a cross-sectional view taken along the line 4—4 of FIG. 2;

FIG. 5 is a fragmentary view of a second embodiment of the invention with the coupling in a connected condition; and FIG. 6 is a fragmentary view of a seal depicted in FIG. 5.

DETAILED DESCRIPTION OF PREFERRED
Embodiments of the Invention

A coupling 10 depicted in FIGS. 1-4 comprised male and female parts 12, 14 affixed to respective mounting plates 16, 18. It will be appreciated that numerous identical couplings 10 are affixed to the plates 16, 18 for simultaneous connection and disconnection as the plates are converged and separated.

The female part 14 includes a metal housing 17 which is affixed to the mounting plate 18 in any suitable fashion, e.g., by bolts 20 passing through holes formed in the housing 16 (see FIG. 4). The housing 17 includes a first end face 22 which faces the male part 12. Extending into the housing 17 through the end face 22 is an aperture 24 of rectangular cross section. The aperture 24 includes planar walls 26, 28 disposed on opposite sides of a longitudinal center axis 30 of the aperture 24. The aperture 24 communicates with a bore 32 of circular cross section which extends to a second end face 34 of the housing.

A fluid passage 36 is formed in the housing 17, one end of which is adapted to be connected to a supply conduit 38 extending to a hydraulic fluid source at the water surface, and another end of which intersects the wall 26 of the aperture 24 to form therewith a port 39 communicating the passage 36 with the aperture 24.

A metal gate 40 is slidably disposed in the aperture 24 and includes planar surfaces 42, 44 which slidably engage the aperture walls 26, 28, respectively. A circular plate 46 disposed within the bore 32 is fastened to one end of the gate 40 by screws 47 and is engaged by a coil compression spring 48 which is constrained axially between the plate 46 and another circular plate 50. The plate 50 is retained within the bore 32 by a split retaining ring 52.

The spring 48 biases the gate 40 toward the end face 22 to a port-blocking position in which the port 39 is blocked. A metal seal member 60 is disposed within an enlarged portion of the fluid passage 36. That seal member 60 comprises a hollow cylinder having a slightly outwardly flared end surface engaging the surface 42 of the gate to form a metal-to-metal seal therewith when the gate is in its port-blocking position. A sealing spring force 62, such as an annular metal ring of C-shaped cross section, is disposed between the seal member 60 and a shoulder of the enlargement, to exert a lateral spring force which biases the seal member 60 toward the aperture 24. An elastomeric O-ring 64 forms a secondary sliding seal between the seal member 60 and a side wall of the enlargement.

Situated opposite the seal member 60 is another metal seal member 70 disposed within a seal carrier 72. The seal carrier is generally cup-shaped, and is threadedly secured within a threaded recess of the housing 16. The seal member 70 is of identical configuration to the seal member 60 and is biased toward the aperture 24 by a sealing spring 62' which is identical to the sealing spring 62. An elastomeric O-ring 64 forms a secondary seal between the seal member 70 and a side wall of the seal carrier 72.

A hole 80 extends laterally through the gate and intersects the surfaces 42, 44 for placing the seal members 60, 70 in fluid communication when the gate 40 is in its port-blocking position, whereby the gate is laterally pressure balanced at the surfaces 42, 44. That is to say, in the absence of the hole 80, pressurized fluid in the passage 36 would impose a lateral force pressing the gate against the wall 28 in a manner generating friction forces with would oppose movement of the gate.

Movement of the gate to a port-opening position is produced by the male part 12 which comprises a metal conduit body 90, a mounting end 91 of which is cylindrical and extends through a hole 92 formed in the plate 16 and is affixed therein by a nut 94. Rotation of the conduit body about its longitudinal axis 93 is prevented by a pin 95 (see FIG. 3) which engages recesses in the plate 16 and conduit body 90. The portion of the conduit body 90 extending from the mounting end 91 in a direction away from the plate 16 is of rectangular cross-sectional shape corresponding to the shape of the aperture 24.

The conduit body 90 has a passage 96 extending therethrough which is connected in any suitable fashion to a valve or other actuating device (not shown) disposed on a subsea well (not shown). The passage 96 includes an axial portion 98 and a lateral portion 100. The axial portion 98 terminates short of the end face 93 of the conduit body 90. At that point of termination, the axial portion 98 is intersected by the lateral portion 100. The lateral portion 100 intersects a pair of planar outer surfaces 102, 104 of the conduit body 90 to form therewith a pair of ports 106, 108, respectively.

Mounted on those outer surfaces 106, 108 is a closure slide assembly 110 which is adapted for axial sliding movement relative to the conduit body 90. The closure slide assembly 110 comprises a block 112 which has formed therein an axial through-hole 114, and a pair of lateral holes 116. The block 112 can be formed of one piece, or of two interconnected pieces each having a lateral hole 116. The lateral holes 116, which intersect the axial hole 114, slidably receive two metal seal elements 118, respectively. Each sliding seal element 118 is recessed at 117 to define an annular sealing surface 120 arranged in sealing contact with a respective one of the outer surfaces 102, 104 of the conduit body 90. The recesses 117 of the seal elements 118 are larger than the diameter of the lateral portion 100 of the passage 96 so that portions of the outer surfaces 102, 104 are exposed.

The seal elements 118 are biased into engagement with the outer surfaces 102, 104 of the conduit body by respective wave springs 130. Those springs allow the seal elements 118 to be pushed open by sufficient pressure existing in the passage 96 as will be subsequently discussed. A coil compression spring 132 biases the closure slide 110 to a position closing the ports 106, 108.

In operation, the coupling 10 is in a disconnected state shown in FIG. 1 wherein the male part 12 is separated from the female part 14. The gate 40 of the female part is biased to its port-closing position shown in FIG. 1 wherein communication between the aperture 24 and the passage 36 is closed by a meal-to-metal seal created by the seal members 60 and 62. Therefore, leakage of hydraulic fluid from the passage 36 is prevented. The lateral forces acting on the gate 40 will be balanced, due to the hole 80 which communicates the seal members 60, 70 with one another. Thus, the seal members 60, 70 will be urged against the gate 40 with equal forces. Also, the portions of the surfaces of the outer surfaces 42, 44 which surround respective ends of the hole 80 and which are exposed by the seal members 60, 70 are of equal area, so the fluid pressure applies equal force to opposite sides of the gate.

The passage 96 in the male part 12 is blocked by the seal elements 118 which form metal-to-metal seals around the ports 106, 108. Hence, sea water cannot enter the passage 96. Alternatively, the seal elements 118 could comprise soft seal members.

The plates 16, 18 will typically each be in a horizontal orientation, with the plate 18 positioned above the plate 16. To connect the coupling 10 (and all other couplings that are joined to the plates 16, 18), the plate 18 is lowered toward the plate 16. As the plate 18 approaches the plate 16, the conduit body 90 enters the aperture 24 in the female part 12 and pushes the gate 40 in a direction away from the end face 22 against the bias of the spring 48 (see FIG. 2). The gate 40 travels within a portion 24' of the aperture which lies in the circular bore 32. Proper alignment between the conduit body 90 and gate 40 can be established by means of alignment pins 133 which project from the end face 93 of the conduit body 90. Those pins can be inserted into cooperating recesses 135 of the gate 40 (see FIG. 3). As the conduit body 90 enters the aperture 24, the closure slide 110 abuts the end face 22, and the spring 132 becomes compressed. Movement of the gate 40 is relatively easy because the lateral forces acting against the gate are minimal and balanced, as observed earlier. This is important, because there will likely be many couplings 10 carried by the plates 16, 18, and in the absence of lateral force balancing at each gate, the total force necessary to interconnect all of the couplings 10 could be substantial. As it is, only the friction of seals 60, 70 and 118 combined with the forces of the springs 48 and 132 of all of the couplings that need be overcome.

As the gate 40 is pushed out of engagement with the seal members 60, 70, its place is taken by the conduit body 90 until a preset gap between mounting plates 16 and 18 is achieved. In that position, the lateral portion 100 of the passage 96 of the conduit body will be aligned sufficiently with the port 39 to communicate the passage 36 with the passage 96 (see FIG. 2). Hydraulic fluid can then flow to the control device. The lateral portion 100 communicates with both seal members 60, 70 to laterally balance the minimal forces due to seal pressure loading applied to the conduit body 90. Thus, the force necessary to subsequently disconnect the coupling 10 will be minimized.

It will be appreciated that since the seal members 60, 70 and seal elements 118 engage planar surfaces of the gate 40 and conduit body 90, it is easier to ensure that a proper seal is established.

When the coupling 10 is subsequently disconnected (FIG. 1), the wave springs 130 permit the seal elements 118 to be moved away from the conduit body 90 under the urging of fluid pressure remaining in the passage 96 to bleed that pressure. In that regard, it might be necessary for such bleeding to occur in order to enable a valve or other device at the well head to assume a rest position. If that feature is not necessary for any or all of the couplings 10, the wave springs 130 could, for example, be replaced by non-yieldable split retaining rings, or the seal elements 118 could be replaced by seal members 60, 70 similar to those of the female part.

It is also possible to position the seal members within the gate 40 and/or the conduit body 90, instead of in the housing 17 and closure slide 110. Such an arrangement is depicted in FIG. 5 in a coupling 10A arranged in a connected state. Each of the seals 150 constitutes a conventional metal C-ring shown in FIG. 6 which are similar to the earlier-described sealing springs 62, 62'. Such metal C-rings 150 could also be used in the embodiment according to FIGS. 1–4; that is, the seal members 60, 70 and sliding seal elements 118 could be replaced by C-rings 150. In FIGS. 5 and 6, elements corresponding to those of FIGS. 1–4 are given the same reference numerals and the suffix "A".

It will be appreciated that the coupling according to the present invention facilitates connection and disconnection, because the pressure forces acting on the gate and conduit body is laterally balanced due to the presence of the holes 80 and 100, respectively. Also, the seal members 60, 70 and seal elements 118 make sealing contact with planar surfaces 42, 44 of the gate 40 and with planar surfaces 102, 104 of the conduit body 90. By contacting planar surfaces instead of, say, cylindrical surfaces, the seal members and seal elements are better able to perform a reliable sealing action.

Although the present invention has been described in connection with preferred embodiments thereof, it will be appreciated by those skilled in the art that additions. deletions, modifications, and substitutions not specifically described may be made without departing from the spirit and scope of the invention as defined in the appended claims.

What is claimed is:

1. A subsea fluid coupling, comprising:
a female part including:
a housing defining a first end face,
an aperture extending longitudinally into said housing through said first end face, said aperture being of non-circular cross-sectional shape and including first and second walls disposed on opposite lateral sides of a longitudinal axis of said aperture,
a first fluid-conducting passage formed in said housing and intersecting said first wall of said aperture to form therewith a first port, and
a gate longitudinally slidably disposed in said aperture and including laterally spaced first and second outer surfaces facing said first and second walls, respectively, said gate being biased longitudinally toward said first end face to a port-blocking position, said gate including a hole extending laterally therethrough for communicating said first port with said second outer surface when said gate is in said port-blocking position;
a male part including:
a conduit body of non-circular cross-sectional shape corresponding to said shape of said aperture and having third and fourth outer surfaces disposed on opposite lateral sides of a longitudinal axis of said conduit body, said conduit body defining a second end face positionable in facing relationship to said aperture of said housing, said conduit body including a second fluid conducting passage therein, said second passage including a first portion extending toward said second end face, and a lateral portion intersecting said third and fourth outer surfaces, respectively, to form therewith second and third aligned ports, said conduit body being sized to enter said aperture through said first end face when said male and female parts are brought together, to push said gate out of its port-blocking position and bring said second and third ports into alignment with said first port, and
a slide mounted on said conduit body for sliding movement longitudinally therealong and being biased to a port-blocking position, said slide including laterally spaced third and fourth generally planar walls arranged to be in alignment with said second and third ports, respectively, when said slide is in its port-blocking position; and
seal means, comprising:
first and second annular metal seals disposed in laterally aligned relationship on said female part, said first seal disposed between said first wall of said aperture and said first outer surface of said gate, said second seal disposed between said second wall of said aperture and said second outer surface of said gate, said first seal arranged in surrounding relationship to said first port and to one end of said hole when said gate is in its port-blocking position, said second seal arranged in surrounding relationship to another end of said hole when said gate is in its port-blocking position, third and fourth annular metal seals disposed in laterally aligned relationship on said male part, said third seal disposed between said third wall of said slide and said third outer surface of said conduit body, said fourth seal disposed between said fourth wall of said slide and said fourth outer surface of said conduit body, said third and fourth seals being in surrounding relationship to said third and fourth ports, respectively, when said slide is in its port-blocking position, said hole conducting fluid pressure to said opposite lateral surfaces of said gate for laterally pressure balancing said gate when said hole is aligned with said first port, said lateral portion of said second passage conducting fluid pressure to said outer surfaces of said gate for laterally pressure balancing said gate when said gate is disposed in said aperture.

2. A subsea fluid coupling according to claim 1, wherein said first and second seals are disposed in said housing, and said second and third seals are disposed in said slide.

3. A subsea fluid coupling according to claim 2, wherein each of said first, second, third and fourth seals comprises a hollow cylindrical member spring biased into its respective sealing contact.

4. A subsea fluid coupling according to claim 3, wherein said second seal is disposed within a cup-shaped seal carrier threadedly connected to said housing.

5. A subsea fluid coupling according to claim 2, wherein at least one of said third and fourth seals is movable out of sealing relationship with said lateral portion under the urging of fluid pressure in said second passage to permit bleeding of that pressure.

6. A subsea fluid coupling according to claim 1, wherein each of said first, second, third and fourth seals comprises a metal ring of C-shaped cross section.

7. A subsea fluid coupling according to claim 1, wherein said first and second seals are disposed in said gate, and said third and fourth seals are disposed in said conduit body.

8. A subsea fluid coupling according to claim 7, wherein each of said first, second, third and fourth seals comprises a metal ring of C-shaped cross section.

9. A subsea fluid coupling according to claim 1, wherein said first and second walls and said first, second, third and fourth outer surfaces are planar.

10. A subsea fluid coupling according to claim 9, wherein said gate and said conduit body are of rectangular cross-section.

11. A subsea fluid coupling according to claim 1, wherein said housing includes an annular bore communicating with said aperture, a coil compression spring disposed in said bore for biasing said gate to its port-blocking position.

12. A subsea fluid coupling according to claim 11, wherein a portion of said aperture is formed in a wall defining said bore.

13. A subsea fluid coupling according to claim 11, further including a coil compression spring for biasing said slide toward its port-blocking position.

* * * * *